Feb. 19, 1935. H. A. S. HOWARTH 1,991,461
BEARING
Filed Oct. 10, 1932 3 Sheets-Sheet 1
Fig. 1.
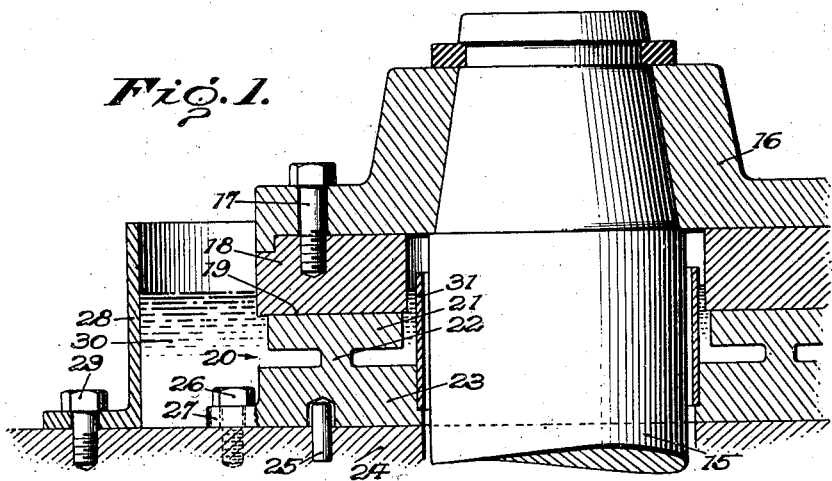
Fig. 2.
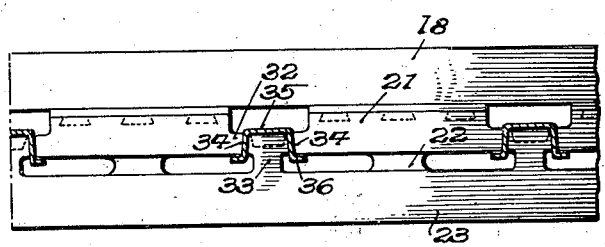
Fig. 3.
Fig. 4.
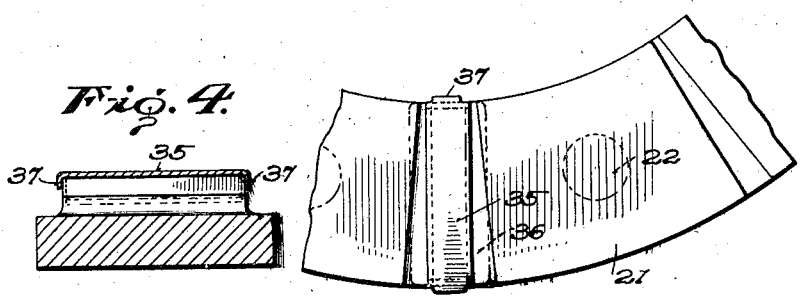
Inventor
Harry A. S. Howarth
By Cameron, Kerkam & Sutton
Attorneys Feb. 19, 1935.   H. A. S. HOWARTH   1,991,461
BEARING
Filed Oct. 10, 1932   3 Sheets-Sheet 2

Inventor
Harry A. S. Howarth

By Cameron, Kerkam & Sutton
Attorneys

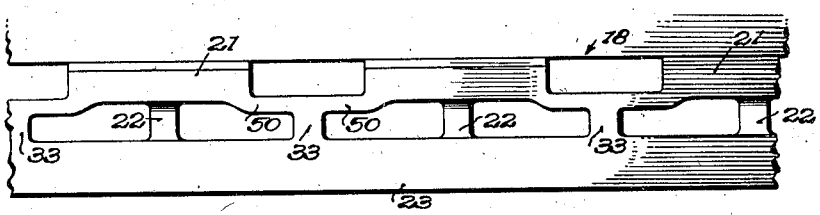
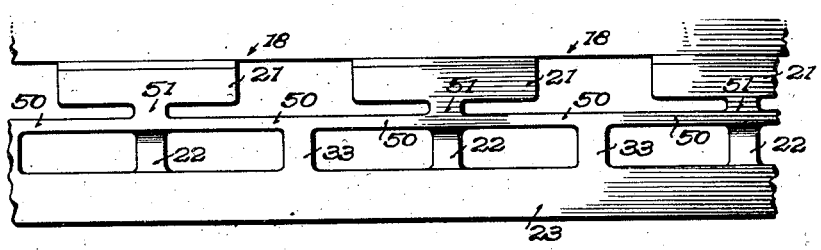
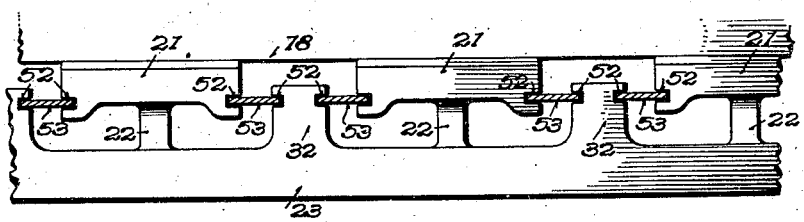
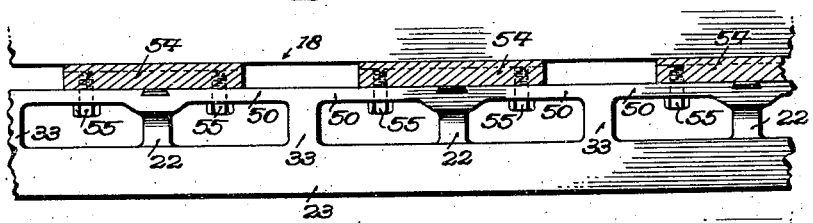
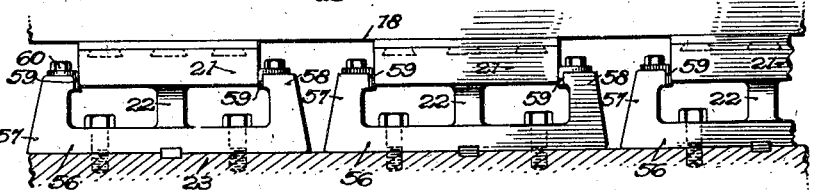
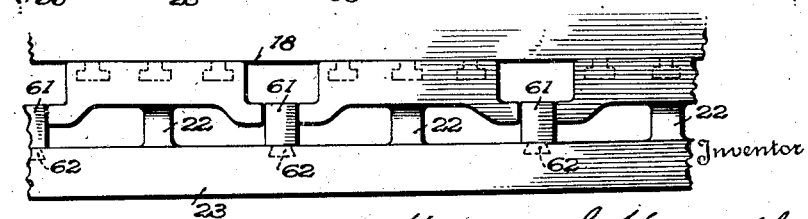

Patented Feb. 19, 1935

1,991,461

UNITED STATES PATENT OFFICE 1,991,461

BEARING

Harry A. S. Howarth, Philadelphia, Pa., assignor to Kingsbury Machine Works, Inc., Philadelphia, Pa., a corporation of Delaware Application October 10, 1932, Serial No. 637,153

28 Claims. (Cl. 308—160)

This invention relates to bearings, and more particularly to bearings of the type employing bearing shoes that are adapted to tilt with respect to the opposed bearing surface in order to form wedge-shaped oil films between the bearing surfaces in conformity with the principle of the Kingsbury bearings.

It has heretofore been proposed to provide a bearing of the Kingsbury type with bearing shoes which are mounted upon elastic posts or stems formed integrally with the shoes and a supporting member, said posts or stems being of such size as to possess sufficient flexibility so as to permit the shoes to tilt and assume the proper relationship with respect to the opposed bearing surface to form suitable wedge-shaped oil films. Each post or stem thereby constitutes a flexible neck between the shoe and its supporting member. A bearing structure of this character possesses certain advantages with respect to the cheapness and facility with which it can be manufactured, and the present invention is primarily concerned with improved constructions of the type referred to.

As is well understood by those skilled in the art, starting friction is appreciably higher than the friction which exists during the normal operation of the bearing after the oil films have been formed between the opposed bearing surfaces. The magnitude of this starting friction therefore tends to cause a relatively high stress to be set up in the flexible neck by which each shoe is supported in the type of construction heretofore referred to, and if said flexible neck is made sufficiently flexible to assure the desired tilting of the shoe under the forces existing during normal operation, there is the danger that the starting friction, particularly under unfavorable conditions, may result in the setting up of stresses in the flexible necks that may produce a permanent distortion or set if not an actual rupture of the flexible necks.

It is an object of this invention to provide a construction of the type heretofore referred to which will assure that the shoes will be adequately restrained against excessive movement under the forces of starting friction, and thereby prevent the setting up of excessive stresses in the flexible necks, while at the same time avoiding substantial interference with the proper flexure of the necks and the tilting of the shoes during the normal operation of the bearing.

Another object of this invention is to provide a bearing of the type characterized with means which will prevent the setting up of undue twisting or torsional stresses in the flexible necks in the event that the forces acting on the shoes are so disposed as to tend to cause a rotation of a shoe with respect to its flexible support, while avoiding substantial interference with the proper flexure of the necks and tilting of the shoes in normal operation.

Another object of this invention is to provide a bearing as above described which is also simple in construction and can be manufactured relatively inexpensively.

Another object of this invention is to provide a novel method for forming a bearing member having one or more bearing shoes supported on integral flexible necks, which method employs relatively simple and inexpensive operations so that the manufacturing operations can be carried out by relatively unskilled labor and at relatively low cost.

Other objects of the invention will appear hereinafter.

The invention is capable of receiving a variety of mechanical expressions, some of which are illustrated on the accompanying drawings, but it is to be expressly understood that the drawings are for purposes of illustration only, and are not to be construed as a definition of the limits of the invention, reference being had to the appended claims for that purpose.

Referring in detail to the drawings, wherein similar reference characters are employed to designate corresponding parts in the respective figures:

Fig. 1 is a part axial section of a bearing, shown somewhat diagrammatically, embodying the present invention;

Fig. 2 is a developed elevation of the bearing members;

Fig. 3 is a fragmentary plan view of the bearing member including the shoes;

Fig. 4 is a radial section through an abutment member interposed between the shoes;

Figs. 7, 8, 9, 10, 11 and 12 are fragmentary elevations to illustrate diagrammatically additional forms which the present invention may take.

Figure 5:
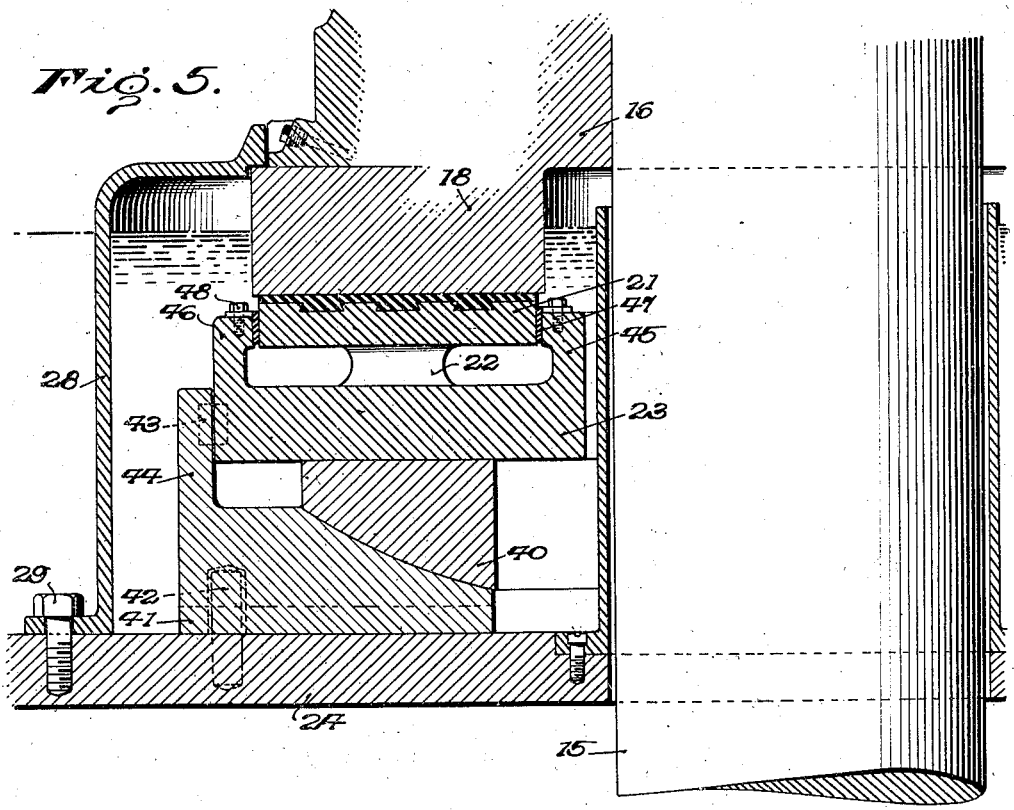
Fig. 5 is a half axial section of another embodiment of the present invention to illustrate means for preventing twisting of the shoes as well as the association of equalizing means with a bearing structure embodying the present invention.

While for purposes of illustration the invention has been shown as embodied in a thrust bearing, it is to be understood that the invention is not necessarily restricted thereto. Again, while the invention has been illustrated in a thrust bearing for a vertical shaft, it is to be expressly understood that the invention is applicable to bearings for horizontal or inclined shafts. Moreover, the invention can be embodied in structures using any suitable number of bearing shoes, and whether the bearing member including the shoes is the relatively rotatable or the relatively stationary element of the bearing. The bearing member including the bearing shoes may also be a complete annulus or it may be split into two or more sections as desired for the particular use to which the bearing is to be put.

In the form shown in Figs. 1, 2, 3 and 4, a shaft 15 is shown as provided with a thrust collar 16 of any suitable construction and having, suitably attached thereto as by one or more screws or bolts 17, a runner 18 provided with a bearing surface 19. Cooperating with the runner 18 is a stationary bearing member 20 composed of a plurality of shoes 21 each of which has an integral, elastic post or stem 22 constituting a flexible neck between the shoe 21 and its base member 23. In this form the base member is shown as mounted directly upon a support 24 without the provision of any interposed equalizing means and as suitably retained against displacement on said support 24 by one or more dowels 25 and one or more screws or bolts 26 passing through ears or a flange 27 projecting from said base member 23. As shown, the bearing structure so formed is surrounded by a wall 28 suitably secured to the support 24, as by screws or bolts 29 passing through a flange of said wall 28, so as to form an oil well 30 in which the bearing members have their bearing surfaces immersed in oil. At the shaft the oil well is completed by a suitable wall 31 which may be carried by the base member 23 or the support 24.

The present invention is immediately concerned with the construction of the bearing member 20, and it is therefore to be expressly understood that any of the remaining elements of the bearing may be constructed in any other suitable way than that illustrated. In conformity with the present invention stops or abutments are interposed between contiguous shoes in a circumferential direction and are so disposed with respect to said shoes that they are adapted to receive the tangential or circumferential thrust of the shoes during the starting of the bearing so as to prevent the setting up of undue stresses in the flexible necks 22, while at the same time they are so disposed with respect to said shoes as not to interfere substantially with the proper tilting of the shoes during the normal operation of the bearing. In order to simplify the construction and reduce the cost of production and minimize the machining operation necessary, the bearing member 20, whether formed as a complete annulus or as a segment of an annulus, is preferably formed in the following manner:

The base member 23, the shoes 21 and the interposed flexible necks 22 are formed as an integral casting with the succeeding shoes connected by integral webs 32 which for simplicity may extend the full radial width of the shoes, although they may be made of shorter radial width if desired. Said webs 32 are in turn integrally connected with the base member by means of integral blocks or webs 33, which are preferably of the same radial width as the webs 32 but are of somewhat less circumferential width than the webs 32 as clearly illustrated in Fig. 2. Said webs or blocks 33 should be of such radial length and circumferential width that they will constitute stops or abutments having sufficient strength to resist any tangential or circumferential thrust which may be exerted thereon from the adjacent shoes before there is any undue flexure of the flexible necks 22 by reason of circumferential displacement of the shoes 21.

Each web 32 is then provided with a pair of parallel cuts 34, as by sawing, so as to sever each shoe from the abutment blocks disposed between the shoes, so that the bearing structure is thereby formed into a base member to which the shoes are integrally connected by flexible necks and which has interposed between the respective shoes relatively rigid integral abutments that are spaced from the contiguous shoes by the width of the cuts. The width of each cut will ordinarily provide too much play in a circumferential direction before the flexible neck can be bent sufficiently to bring the radial edge of the shoe into contact with the adjacent stop or abutment, and therefore to reduce the possible circumferential movement of each shoe within a safe limit and thereby prevent undue stressing of the flexible neck, a filler piece is interposed between each abutment and the contiguous shoes. This filler piece is preferably formed of sheet metal of a thickness which is nearly equal to or slightly less than the width of the cut, and while it may be constructed and mounted in any suitable way, the filler piece is desirably formed as a channel-shaped member 35 inverted over the stop or abutment. To prevent displacement of the filler piece off of the stop or abutment in an axial direction said piece may be provided at each edge of the channel with an outwardly directed flange 36 which will project under the adjacent shoe so as to prevent the filler plate from being lifted off of its support, said flanges 36 being so disposed, however, as not to interfere with the proper tilting of the shoe. As the cuts 34 are parallel each filler piece may be readily moved into position by sliding them lengthwise over the stop or abutment, and to prevent the filler piece being thereafter displaced radially with respect to the abutment, each filler piece may be provided with end tabs 37 which may be bent down over the ends of the abutment 33 as shown more particularly in Fig. 4.

As the filler pieces thereby substantially fill the spaces between each stop or abutment 33 and the contiguous ends of the shoes on either side of the abutment, any tendency of the shoes to be moved tangentially or circumferentially by reason of the forces existing at starting, and for either direction of rotation, causes the shoes to be supported in the tangential or circumferential direction by reason of the rigid abutments or stops 33 which receive the thrust from the shoes and therefore resist such displacement as will result in the setting up of undue stresses in the flexible necks 22. At the same time the filler pieces offer no substantial opposition to the tilting of the shoes 21 and therefore in the normal operation of the bearing the shoes may readily tilt by reason of the flexibility of the elastic necks 22 so that the proper wedge-shaped oil films are set up between the opposed bearing surfaces.

Figure 6:
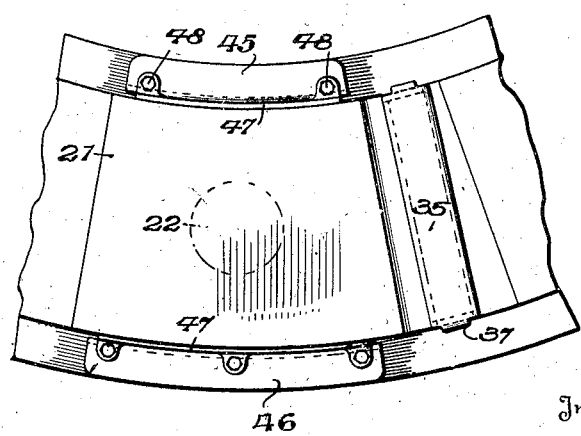
Fig. 6 is a fragmentary plan view of the bearing member including the shoes of the Fig. 5 construction.

In the form shown in Figs. 5 and 6, equalizing means are shown interposed between the base member 23 and the support 24. In the form shown, the equalizing means takes the form of a spherically-faced leveling washer 40 seated in a spherically-faced lower base ring 41 which may be secured to the base 24 in any suitable way as by dowels 42. The leveling washer 40 may, if desired be formed integrally with the base member 23, in which case dowels may be interposed between the washer 40 and lower base ring 41 to prevent relative rotation, or the leveling washer 40 may be formed separately from the base member 23, in which event relative rotation between the base member 23 and the lower base ring 41 may be prevented by keys 43 interposed between the base member 23 and an upstanding flange 44 on the lower base ring 41.

The construction of Figs. 5 and 6, which in so far as the provision of means to prevent undue stresses being set up in the flexible necks 22 by tangential or circumferential forces may be the same as heretofore described in Figs. 1 to 4 or may take the form of any of the other embodiments of the present invention, also illustrates the provision of means for preventing undue torsional stresses being set up in the flexible necks 22, a provision which may be incorporated in any of the embodiments of the present invention where desired. As here shown, the base member 23 is formed as a channel, being provided with axially extending inner and outer walls or lugs 45 and 46 which form stops or abutments and are preferably cast integrally with the base member 23. The walls 45 and 46 may be cast integrally with the shoes 21 and then cut therefrom along circumferential lines at the inner and outer peripheries of the shoes, or in casting the shoes may be spaced from said channel walls 45 and 46. Whether the shoes be formed integrally with the channel walls and thereafter cut therefrom, or whether they originally be spaced therefrom, the space existing between the inner and outer peripheries of the shoes and the adjacent channel walls have filler pieces so that if a shoe be subjected to stresses which may tend to rotate the shoe around the flexible neck 22, sufficient play between the shoe and the channel walls will not exist to set up undue stresses in the flexible necks. As shown, filler pieces 47 are suitably attached to the channel walls 45 and 46, as by screws 48, and have their inwardly directed webs of a thickness approximating the space between the shoe and the adjacent channel walls. If desired, recesses may be machined for the reception of these filler pieces. Said filler pieces will therefore prevent any substantial rotation of the shoes to unduly stress the flexible necks, while at the same time sufficient clearance will be provided so as to assure that the shoe will tilt properly, both radially and tangentially, to form the desired wedge-shaped openings between the bearing surfaces for the formation of proper oil films. As will be apparent the type of filler piece shown at the radially inner and outer edges of the shoes in Figs. 5 and 6 could if desired replace the filler pieces of Figs. 1 to 4.

If the webs 32 be of sufficient circumferential length so that they have the requisite flexibility to permit the shoes to tilt properly and form wedge-shaped oil films and if at the same time the webs be of sufficient thickness so that they can withstand and transmit to the stops or abutments 33 the thrust exerted tangentially or circumferentially when the bearing is started, it is unnecessary to sever the webs 32 and interpose filler pieces. Such a construction is illustrated somewhat diagrammatically in Fig. 7 wherein the webs 50 are shown as of considerable length in a circumferential direction as to afford the requisite flexibility for permitting the shoes to tilt properly in operation. Otherwise the construction is or may be the same as that heretofore described.

Where it is desired to use a continuous web as just referred to, the construction shown in Fig. 8 may be employed. In this construction the shoes 21 are connected to a continuous web 50 by a short neck 51 in alignment with and forming an extension of the flexible neck 22. The continuous web 50 thereby acts as a flexible strut between the stop or abutment 33 and the neck 22 adjacent the latter's connection to the shoe, so that the tangential or circumferential thrust on the shoes is properly resisted, while at the same time the prolongation of the necks 22 in the sections 51 enables the shoes to tilt by elastic deflection of the necks and webs without as much resistance to the deflection as exists where the webs are connected directly to the radial edges of the shoe.

In place of integral webs between each stop or abutment 33 and the shoes 21 as heretofore described, a separate flexible thrust supporting web may be inserted between each stop or abutment 33 and the adjacent edge of each shoe as shown in Fig. 9. Here as in embodiments previously described the stop or abutment 33 is cast integrally with the base member 23, but no integral web is formed between said stop or abutment and the contiguous shoes. In place thereof, grooves 52 are cut in each edge of the stop or abutment and in each edge of the shoe and a plate 53 is positioned in said grooves and properly retained therein, said plate having sufficient stiffness to transmit tangential thrusts from the shoe to the stop or abutment and sufficient yieldability to permit the shoe to tilt properly by elastic deformation of the neck 22.

Fig. 10 illustrates a construction which generally follows the construction of Figs. 1 to 4 and Fig. 7 except that the bearing portion of the shoe 54 is formed separately from the cast integral structure and suitably attached thereto as by screws 55. If the connecting webs between the shoes 54 are of sufficient flexibility to permit the proper tilting of the shoes, these webs may be left unsevered as in the construction of Fig. 7, or if preferred the webs can be cut and filler pieces introduced as in the construction of Figs. 1 to 4.

The present invention also contemplates the provision of individual shoe units each composed of a shoe 21, flexible neck 22 and base member 56 as shown in Fig. 11. In this embodiment the base member is provided with upstanding stops or abutments 57 and 58 adjacent each radial extremity of the shoe and filler pieces 59 are suitably mounted on said stops or abutments, as by screws 60, and transmit the tangential or circumferential thrust from the shoe to the stop or abutment. In this embodiment the unit may be cast with spaces between the shoe and the adjacent abutments, in which case the casting may be machined to receive the filler pieces, or the shoe may be cast integrally with the stops or abutments and thereafter cut therefrom, with filler pieces thereafter interposed analogously as heretofore described in conjunction with the embodiments of Figs. 1 to 6.

If desired, the stops or abutments may be formed separately from the base member and then separately applied to the base member between the shoes to provide the proper thrust supporting elements as heretofore described. Such a construction is illustrated in Fig. 12 wherein the stops or abutments 61 are formed separately from the base member 23 and suitably attached thereto as by keys 62. This construction requires the fitting of the stops or abutments to the spaces between the shoes with proper clearances to perform the functions heretofore described, and possesses the disadvantage that the key connection to the base member lacks the strength inherent in the integral construction, but this construction has certain advantages of its own in the direction of simplicity and cheapness of construction.

It will therefore be perceived that the present invention enables a bearing structure to be composed of an integrally united cast unit composed of one or more shoes wherein each shoe is mounted on and connected to a base member by means of an interposed elastic neck which will flex sufficiently to permit the shoe to tilt and form the desired wedge-shaped oil film, and at the same time each shoe is sufficiently restrained against tangential or circumferential movement or rotary movement or both so as to prevent the setting up in its elastic neck of such stresses as might tend to produce a permanent distortion or a rupture at the neck. At the same time a simple and inexpensive method of construction has been provided because the requisite stops or abutments for effecting the foregoing function may be cast integrally with the unit of shoes, necks and base member, and when employed the severing of the webs and the forming and insertion of the filler pieces are simple operations which do not require skilled labor.

While the embodiments of the invention illustrated on the drawings have been described with considerable particularity, it is to be expressly understood that the invention is not restricted thereto. The illustrated embodiments have been selected for the purpose of exemplifying various forms which the invention may take, and it will now be apparent to those skilled in the art that the invention may receive other mechanical expressions, that changes may be made in the details of construction, arrangement and proportion of parts, and that some features can be used without other features. If the rotatable bearing member is to rotate in one direction only, the provision of thrust transmitting means for the opposite direction of rotation may be omitted, if desired. It is also to be understood that the bearing structure of the present invention may be associated with any suitable equalizing structure or employed without an equalizing structure, and it may be mounted and associated with cooperating bearing elements of any suitable construction and in a wide variety of ways and for use in a wide variety of structures. Reference is therefore to be had to the appended claims for a definition of the limits of the invention.

What is claimed is:

1. In a bearing, the combination of a base member, one or more shoes each connected to said base member by an interposed flexible neck, and means cooperating with each shoe for resisting the thrust exerted thereon in its own plane when the bearing is started in operation.

2. In a bearing, the combination of a base member, one or more shoes each connected to said base member by an interposed flexible neck, and thrust receiving means cooperating with each shoe for resisting circumferential displacement of the shoe to an extent that would unduly stress said flexible neck.

3. In a bearing, the combination of a base member, one or more shoes each connected to said base member by an interposed flexible neck, and an abutment cooperating with a circumferentially directed end of each shoe to prevent undue stressing of said neck.

4. In a bearing, the combination of a base member, one or more shoes each connected to said base member by an interposed flexible neck, and means integral with the base member and cooperating with each shoe for preventing undue bending of said neck circumferentially of the bearing.

5. In a bearing, the combination of a base member, one or more shoes each connected to said base member by an interposed flexible neck, and means cooperating with each shoe for preventing the exertion of undue torsional stress on said flexible neck.

6. In a bearing, the combination of a base member, one or more shoes each connected to said base member by an interposed flexible neck, and means closely embracing each shoe at its outer and inner periphery for preventing substantial rotation of the shoe.

7. In a bearing, the combination of a base member, one or more shoes each connected to said base member by an interposed flexible neck, and means integral with said base member and cooperating with each shoe for preventing the exertion of undue torsional stress on said flexible neck.

8. In a bearing, the combination of a base member, one or more shoes each connected to said base member by an interposed flexible neck, an abutment on said base member disposed between contiguous edges of adjacent shoes, and means for transmitting circumferential thrust from a shoe to said abutment.

9. In a bearing, the combination of a base member, one or more shoes each connected to said base member by an interposed flexible neck, abutments on said base member adjacent the inner and outer edges of each shoe, and means between the shoe and said abutments for resisting rotary displacement of the shoe.

10. In a bearing, the combination of a base member, one or more shoes each connected to said base member by an interposed flexible neck, and abutments carried by said base member and projecting into thrust receiving relation with the edges of contiguous shoes.

11. In a bearing, the combination of a base member, one or more shoes each connected to said base member by an interposed flexible neck, an abutment integral with said base member and projecting between each pair of shoes, and means carried by said abutment and constituting thrust transmitting elements between each abutment and adjacent shoes for preventing undue circumferential displacement of the shoes.

12. In a bearing, the combination of a base member, one or more shoes each connected to said base member by an interposed flexible neck, an abutment on said base member projecting between each contiguous pair of shoes, and a web integral with said abutment and the shoes on either side thereof.

13. In a bearing, the combination of a base member, one or more shoes each connected to said base member by an interposed flexible neck, an abutment on said base member projecting between each contiguous pair of shoes but separated therefrom, and a filler piece carried by each abutment and substantially filling the spaces between said abutment and the adjacent shoes.

14. In a bearing, the combination of a base member, one or more shoes each connected to said base member by an interposed flexible neck, an abutment on said base member projecting between each contiguous pair of shoes but separated therefrom, and a filler piece carried by said abutment and substantially filling the spaces between said abutment and the adjacent shoes, said filler piece being channel-shaped in cross-section with its sides projecting into the spaces between the abutment and the adjacent shoes.

15. In a bearing, the combination of a base member, one or more shoes each connected to said base member by an interposed flexible neck, an abutment on said base member projecting between each contiguous pair of shoes but separated therefrom, and a filler piece carried by said abutment and substantially filling the spaces between said abutment and the adjacent shoes, said filler piece being channel-shaped in cross-section and provided with outwardly directed flanges for projecting under adjacent shoes and preventing displacement of said filler piece from said abutment.

16. In a bearing, the combination of a base member, one or more shoes each connected to said base member by an interposed flexible neck, an abutment on said base member projecting between each contiguous pair of shoes but separated therefrom, and a filler piece carried by said abutment and substantially filling the spaces between said abutment and the adjacent shoes, said filler piece being provided with means for preventing displacement of said filler piece from said abutment.

17. In a bearing, the combination of a base member, one or more shoes each connected to said base member by an interposed flexible neck, an abutment on said base member projecting between each contiguous pair of shoes, and a web integrally connected with said abutment and with the necks of adjacent shoes.

18. In a bearing, the combination of a base member, one or more shoes each connected to said base member by an interposed flexible neck, an abutment carried by said base member and projecting between the contiguous radial edges of adjacent shoes, and flexible thrust-transmitting members interposed between the abutment and the adjacent shoes.

19. In a bearing, the combination of a base member, one or more shoes each connected to said base member by an interposed flexible neck, an abutment carried by said base member and projecting between the contiguous radial edges of adjacent shoes, and flexible thrust-transmitting members interposed between the abutment and the adjacent shoes, each flexible thrust-transmitting member being integral with an abutment and the adjacent shoes.

20. In a bearing, the combination of a base member, one or more shoes each connected to said base member by an interposed flexible neck, and an abutment between contiguous shoes and integrally connected by interposed thrust-transmitting webs with said flexible necks, each shoe being provided with a removable bearing surface portion.

21. In a bearing, the combination of a base member, a shoe connected to said base member by an interposed flexible neck, and one or more abutments projecting from said base member into adjacency with the edge of said shoe for preventing undue flexure of said neck, whereby said shoe, neck, base member and abutment constitute an integral unit.

22. In a bearing, the combination of a base member, a shoe connected to said base member by an interposed flexible neck, and one or more abutments projecting from said base member into adjacency with the edge of said shoe for preventing undue flexure of said neck, said shoe, neck, base member and abutment constituting an integral unit, and means carried by said abutment and substantially filling the space between the abutment and the contiguous edge of the shoe.

23. In a bearing, the combination of a cast integral unit comprising a base member, one or more shoes integrally connected thereto by interposed flexible necks, thrust receiving members between the shoes and interposed webs, said webs being severed between each shoe and thrust receiving member and the gap between each shoe and thrust receiving member being filled with thrust-transmitting means which will not substantially interfere with the proper tilting of said shoes by flexure of said necks.

24. A cast integral bearing unit that comprises a bearing shoe, a base member integrally connected to said shoe by an interposed flexible neck, and one or more abutments integrally connected to said base member and projecting into adjacency with the edge of the shoe.

25. A cast integral bearing unit that comprises a base member, a plurality of shoes integrally connected to said base member by interposed flexible necks, and thrust receiving members integral with said base member and projecting between contiguous shoes into thrust-receiving relationship therewith.

26. A cast integral bearing unit that comprises a base member, a plurality of shoes integrally connected to said base member by interposed flexible necks, thrust-receiving members integral with said base member and projecting between contiguous shoes into thrust-receiving relationship therewith, and integral webs connecting said thrust-receiving members and adjacent shoes.

27. A cast integral bearing unit that comprises a base member, a plurality of shoes integrally connected to said base member by interposed flexible necks, thrust-receiving members integral with said base member and projecting between contiguous shoes into thrust-receiving relationship therewith, and flexible webs integral with said thrust-receiving members and the adjacent shoes.

28. A cast integral bearing unit that comprises a base member, a plurality of shoes integrally connected to said base member by interposed flexible necks, thrust-receiving members integral with said base member and projecting into thrust-receiving relationship therewith, and filler pieces substantially filling the gaps between said members and the contiguous edge of said shoes.

HARRY A. S. HOWARTH.